Figure 1:
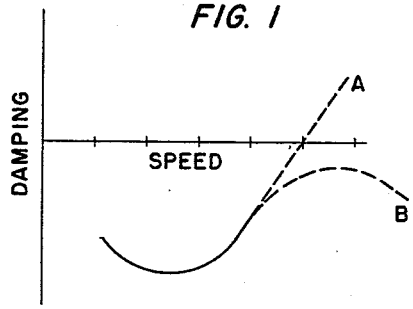

Jan. 22, 1963 W. R. NASS 3,074,385
DYNAMIC TESTING APPARATUS
Filed May 15, 1958 3 Sheets-Sheet 1

INVENTOR.
WALTER R. NASS
BY
*Walter J. Jason*
ATTORNEY

Jan. 22, 1963 W. R. NASS 3,074,385
DYNAMIC TESTING APPARATUS
Filed May 15, 1958 3 Sheets-Sheet 2

INVENTOR.
WALTER R. NASS
BY
*Walter J. Jason*
ATTORNEY

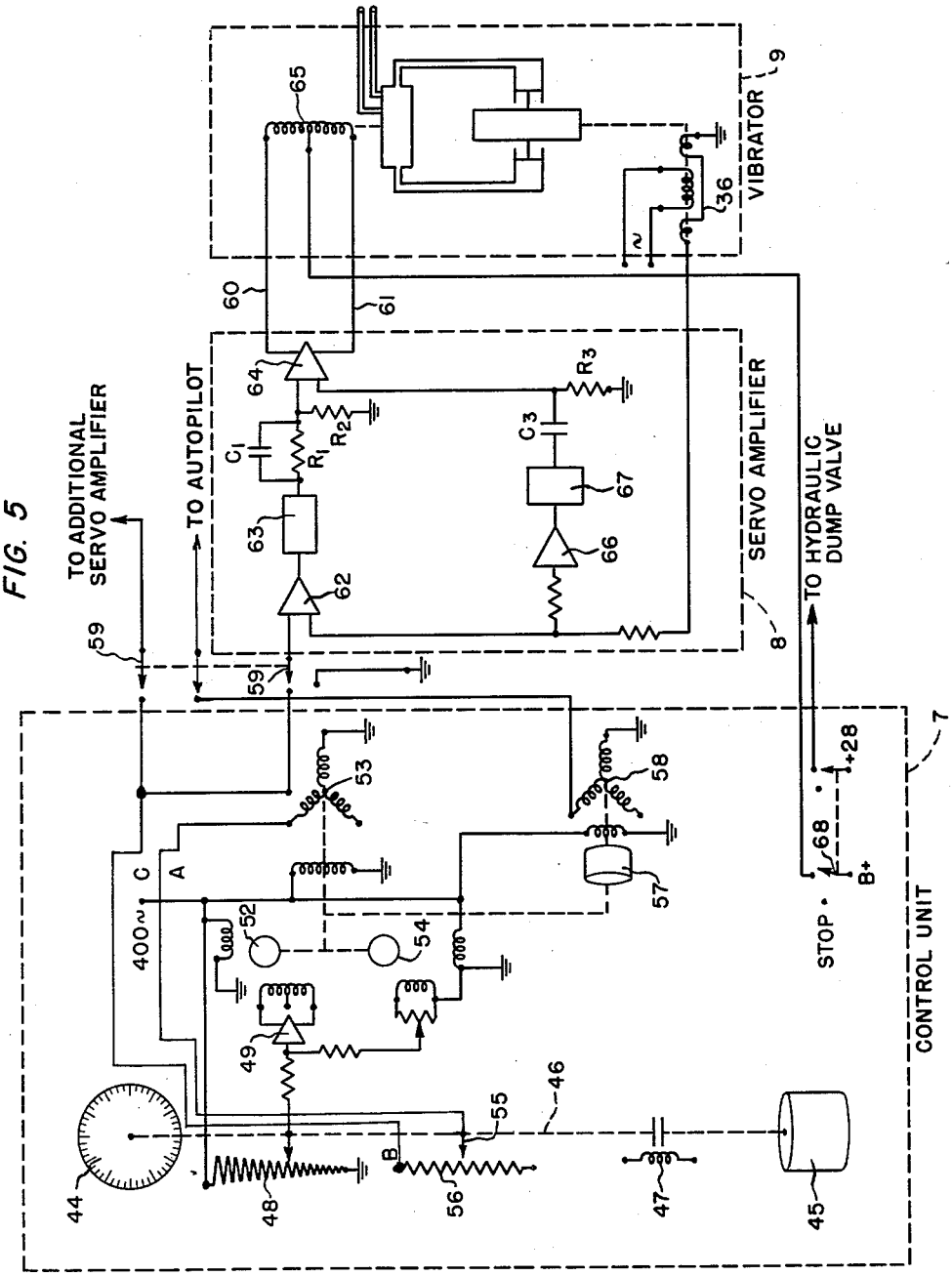

3,074,385
DYNAMIC TESTING APPARATUS
Walter R. Nass, Escondido, Calif., assignor to General Dynamics Corporation, San Diego, Calif., a corporation of Delaware
Filed May 15, 1953, Ser. No. 355,477
1 Claim. (Cl. 121—147)

The present invention relates to dynamic testing apparatus and more particularly to testing apparatus for use in determining the characteristics of structural elements when subjected to loads.

Briefly, the system disclosed herein comprises one or more vibrators positioned in desired locations within a structure to be tested, a power supply for the vibrators, and means for controlling the output frequency and intensity of the vibrators. This system has found considerable application in exploring flutter vibration characteristics of various types of aircraft.

In the past, simulated flutter vibration tests were conducted while the aircraft were on the ground. In these tests, generally an actuator of some sort is placed against the structure to be tested. The actuator is then energized to impart a force to the structure and then withdrawn therefrom to permit observation of the effects caused by the force. The disadvantage of this type of testing is that the aircraft, while on the ground, is not in the environment for which it is intended. Thus, the results of flutter vibration tests conducted on the ground only approximate what actually occurs while the aircraft is in flight.

Obviously, the preferred method is to perform the tests while the aircraft is flying. The big difficulty here is the fact that there is very little space available within an aircraft for the necessary vibrators. The present invention, however, overcomes this disadvantage and permits the flutter vibration test to be made "in-flight."

Exploration of the flutter vibration characteristics of an aircraft consists of artificially stimulating an aircraft's structural vibrations by sweeping the vibrators through a range of frequencies during flight. By measuring the structural action with instruments that measure vibration amplitudes, resonant frequencies of the structure can be determined. Then, at several safe flight speeds, the structure is vibrated at selected resonant frequencies and the stimulation suddenly stopped. For each test, the time required for the structural vibration to decay to a given value is noted and the value of the damping calculated. This information can then be used to predict the aircraft speed at which the structural vibrations may not decay, but may instead become dangerous.

In order to stimulate the structural vibrations the vibrators must be capable of considerable force outputs. In addition, as has been mentioned, the vibrators must be small and compact in order to fit in the space available, such as within the thin wing section of a supersonic aircraft. Although the present invention has found considerable use in in-flight flutter analysis of aircraft, it will be apparent that because of the small size and large force output of the vibrators, the present invention can be used in applications other than aircraft flutter vibration tests.

Prior art types of vibrators are rather complex, expensive, and plagued with maintenance problems. The vibrators in the present invention are relatively simple, inexpensive, and maintenance free. For example, the present invention has been installed in an aircraft and an entire flutter vibration test completed without any of the plurality of vibrators used having to be serviced. Reliability of this equipment is an important consideration because of the large costs involved in any given flight during a flight test program.

In addition to being unreliable, many former types of vibrators do not generate "pure" motions; that is, in attempting to produce a motion in one direction only, they also produce a small component of motion in another direction. For many applications this is a serious disadvantage. In contrast to former types, the vibrators in the present invention produce a pure translational motion.

Vibrators consisting of a motor with an attached eccentric flywheel have been used in the past in aircraft to stimulate structural vibrations. However, it has been found that this type of vibrator cannot be stopped quickly enough to permit observation of vibration decay rates. The vibrators in the present invention can be stopped very rapidly, allowing observation of the effects induced by the vibrators. Also, because of their small size, the vibrators can be used in many areas where it would be impossible to use a motor and flywheel.

It is therefore an object of the present invention to provide improved means for stimulating vibrations in structural elements.

Another object is to provide a dynamic testing apparatus which can be stopped suddenly to permit observation of effects induced by said testing apparatus.

Another object is to provide a means for stimulating structural vibrations in an aircraft while the aircraft is in flight.

Another object is to provide a cyclic force producing apparatus in which the frequency of the output force may be varied or controlled.

Another object is to provide a cyclic force producing apparatus in which the magnitude of the output force may be varied or controlled.

Another object is to provide a dynamic testing apparatus having one or more vibrators which are more versatile, efficient, and less expensive than former types.

Another object is to provide a dynamic testing apparatus having one or more vibrators which have a high degree of reliability, yet are small and compact.

Figure 2:
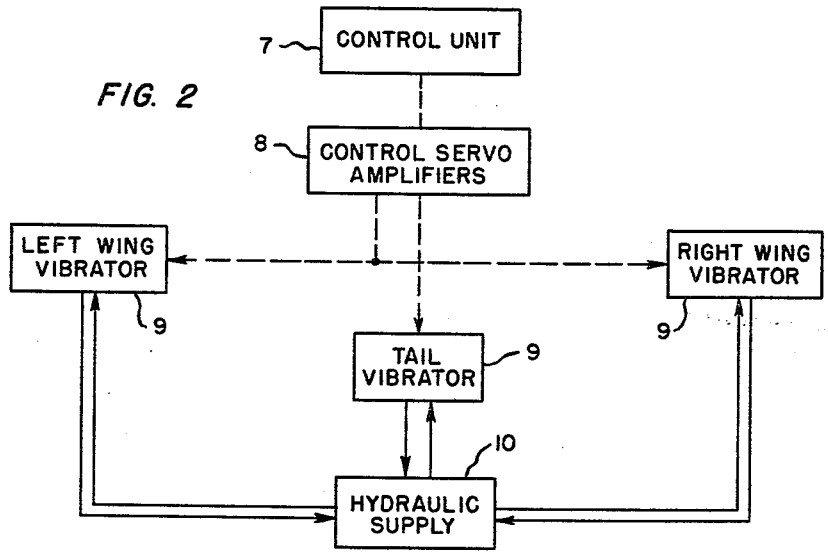
Figure 6:
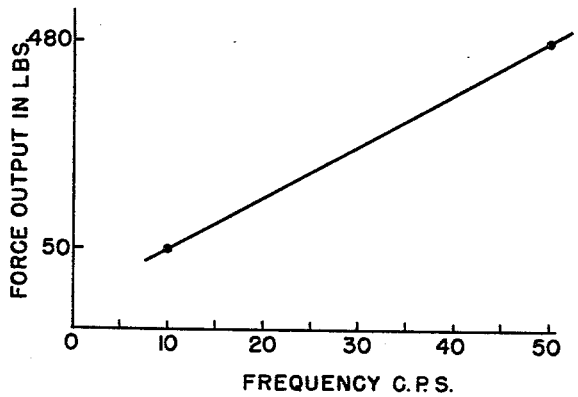
Figure 4:
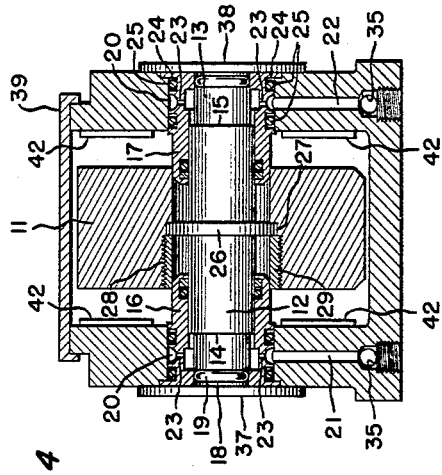
Figure 3:
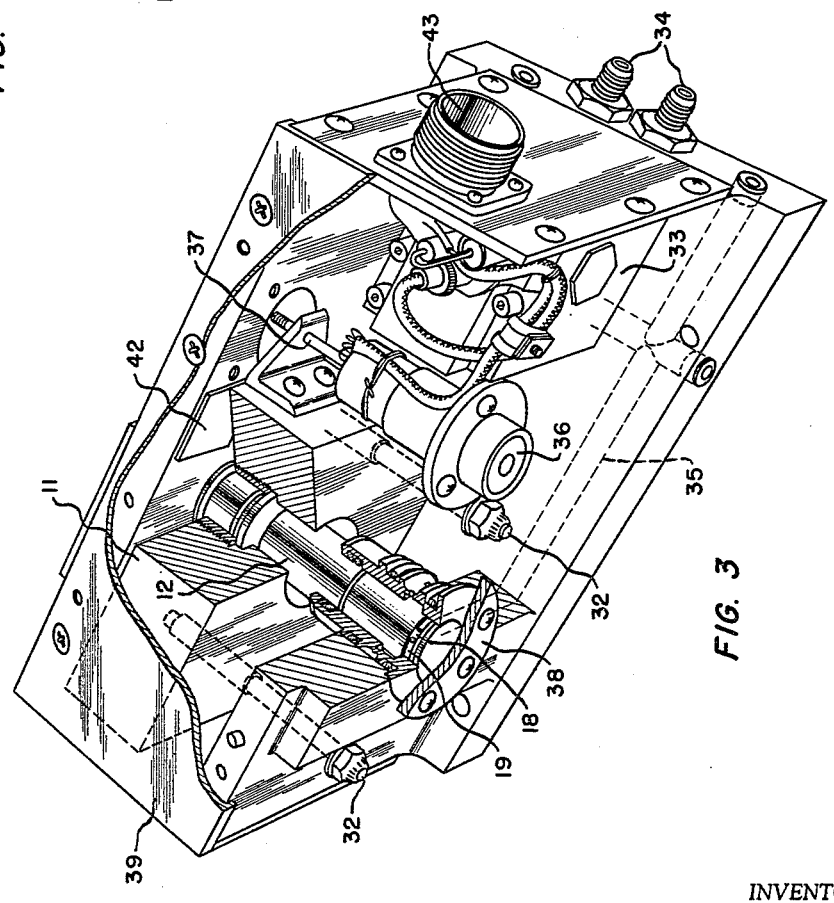

Other objects and features of the present invention will be readily apparent to those skilled in the art from the following specification and appended drawings wherein is illustrated a preferred form of the invention, and in which:

FIGURE 1 is a graph showing aircraft speed vs. vibration damping of a hypothetical aircraft wing,
FIGURE 2 is a block diagram of the testing apparatus,
FIGURE 3 is a perspective view of a vibrator with portions broken away,
FIGURE 4 is a cross-section of the vibrator shown in FIGURE 3,
FIGURE 5 is a functional schematic of the system and,
FIGURE 6 is a graph illustrating vibrator force output vs. frequency for a typical program.

The present invention has application in many areas where it is desired to subject structural elements to dynamic loads (changing loads). For purposes of disclosure the invention shown herein is located in an aircraft with the vibrators placed in the wings and tail of the aircraft. It should be apparent that these locations are particularly restrictive as to the amount of space available for test apparatus. Utilizing the present invention in this manner provides a realistic and accurate means of determining the damping characteristics of the aircraft wings and tail.

FIGURE 1 is a graph of damping vs. aircraft speed for a hypothetical aircraft wing containing a vibrator. The region of damping below the horizontal line shown in FIGURE 1 represents an area where structural vibrations are attenuated. The region of damping above the horizontal line represents an area where structural vibrations are no longer attenuated, but are reinforced and hence represents a dangerous area. The dashed curve B shown in FIGURE 1 corresponds to a wing whose vibration characteristics are acceptable because the curve remains in the safe region of damping. The dashed curve A corresponds to a wing whose vibration characteristics are dangerous since the curve enters the region where vibrations build up. It can be seen that an investigation of only a portion of the curve, at low speed, will provide enough information for an extrapolation to determine what will happen at higher flight peeds. Thus, it is not necessary to actually investigate dangerous flight regions to determine what will happen in those regions.

FIGURE 2 is a block diagram illustrating the complete dynamic testing apparatus. As shown, the apparatus consists of a control unit 7, control servo amplifiers 8 which are connected to the control unit, vibrators 9 installed in each wing and the tail surface of an aircraft, and which are connected to the amplifiers 8 and also to a hydraulic supply 10.

The vibrators 9, or force generating apparatus, are fixed to the aircraft's structure and when they vibrate in response to command signals they induce vibrations in the structure to which they are attached. Since the vibrators do not "force" the structural vibrations but only "stimulate" or "induce" the structural vibrations, there is no set phase relation between the motion of a vibrator and the motion of the structure. Generally, the phase relation depends on the frequency at which a vibrator is being operated and the natural frequency of the structure to which it is attached.

The power for the vibrators is derived from the hydraulic supply 10, which is, essentially, an electric motor-operated high pressure oil pump with reservoir.

Command signals which control the vibrators are produced by the control unit 7. This control unit provides a central point from which the apparatus can be operated, and includes provisions for starting and stopping the vibrators, selection of vibration to either the wings or the tail, and a choice of automatic or manual frequency sweep. Inasmuch as there are applications where it is necessary to be able to command the aircraft's autopilot from the control unit, a provision has been made for this too. This provision for commanding the aircraft's autopilot is utilized when it is desired to subject the aircraft structure to very low frequency vibrations which the autopilot is capable of producing by movement of the aircraft control surfaces.

Referring now to FIGURE 3, the general construction and operation of a vibrator can be explained. In this FIGURE, a large mass 11 is shown attached to a double-ended piston 12. This piston with attached mass is hydraulically forced to move rapidly back and forth in translational motion. The force generated by the vibrator is the result of a reaction associated with the acceleration and deceleration of the mass. Newton's third law states "for every action there exists an equal and opposite reaction." Thus by fixing a vibrator to a structural element, the element is subjected to dynamic loads. The motion of the piston and mass is essentially harmonic, so the output force generated by the vibrator can be expressed $F=MA=MXW^2 \cos wt$ where M is the total mass of the piston with mass attached, X is the amplitude of movement in one direction, and W is the frequency of vibration. Thus, neglecting the dependence on time, the force output F is proportional to $MXW^2$.

In addition to the piston and mass, as shown in FIGURE 3 the vibrator includes a valve 33 and a transducer 36 which has a movable element attached to move with mass 11. The purpose of the valve and transducer will become more apparent in the description of operation of the vibrator hereinafter explained.

FIGURE 4 more clearly illustrates the piston operation. The piston 12 slides to and fro on a guide rod 13 in response to hydraulic pressure on the piston end 14 or 15. Cylinders 16 and 17 fit over the piston ends and admit hydraulic fluid to them. Each cylinder has a circumferential recess 20 which receives hydraulic fluid from the line 21 or 22. The hydraulic fluid is then ported through ports 23 in the recess to the region immediately adjacent the end of the piston where pressure can be exerted on the piston. The cylinders contain grooves 24 for seating O-ring seals 25 that prevent leakage of hydraulic fluid. The piston guide rod 13 also has O-ring grooves 18 and O-ring seals 19.

The piston 12 has a central flange 26 which fits into a recess 27 of the mass 11. The recess 27 is at the end, or bottom, of a threaded recess 28 and when a threaded ring 29 is screwed into recess 28 the piston 12 and mass 11 are mechanically locked together. The vibrator mass has guide rods 32, shown in FIGURE 3, to prevent any rotational motion of the mass and to aid in producing a purely translational motion in response to hydraulic pressure unbalances on the piston ends. A conventional pressure control type of servo valve is used to regulate the hydraulic fluid flow to the cylinders. The valve responds to electrical signals from a servo amplifier, establishing the proper pressures in the cylinders to generate the desired force on the pistons. The valve is located within the vibrator and is indicated in FIGURE 3 by the numeral 33. Hydraulic fluid is supplied to the valve through the hydraulic connectors 34. The hydraulic lines 35 carry the fluid from the valve to the cylinders. Only one of the lines 35 is shown in FIGURE 3.

Each vibrator and its respective servo amplifier form a position-type servo system. The function of the servo system is to make the mass of the vibrator follow the electrical command signals. To do this, the servo system requires knowledge of the position of the vibrator mass. This position information is provided by a conventional displacement transducer 36 shown in FIGURE 3. The transducer used in this embodiment is a differential transformer transducer. The output of the transducer depends on the position of a paramagnetic core within the transducer. This core is attached to arm 37 shown in FIGURE 3. Arm 37 is attached to the mass 11, making the core position, and thus the output of the transducer, dependent on the position of the mass.

The vibrators in the present invention are constructed to facilitate inspection and repair, if needed, and installation. On the sides of the vibrator, shown in FIGURE 4, are two plates 37 and 38 that help seal the cylinder chambers and which hold the cylinders and piston guide rod in place. When these plates are removed, the cylinders and piston guide rod can be pulled out of the vibrator. Then, by removing the cover plate 39, detaching the transducer from the mass, and removing the guide rods from the mass, the mass and piston can be pulled out of the vibrator. FIGURE 4 shows rubber pads or cushions 42 attached to the inner walls of the vibrator but these do not interfere with the removal of the piston from the vibrator. The pads 42 are merely a safety feature to prevent damage in case of improper operation.

For ease of installation, external hydraulic connectors 34 are provided, shown in FIGURE 3, which connect the hydraulic power supply with the servo valve 33. An external electrical connector 43 provides a means for making quick and easy electrical contact with the rest of the test apparatus.

FIGURE 5 illustrates the electrical connections required by a vibrator. The functional schematic shown in FIGURE 5 is comprised of a control unit 7, a servo amplifier 8, and a vibrator 9. These are shown within the dashed outlines.

The control unit contains the electrical apparatus for producing the command signal which controls the vibrator. A type "0" servo (or regulator system) is used to generate the frequency of the command signal. A Wiley and Sons publication entitled "Servomechanisms and Regulating System Design" by "Chestnut and Mayer," describes and explains the operation of a type "0" servo on page 206 which is substantially the same as the servo employed in the instant invention. The servo system produces an electrical output signal whose frequency depends on the input quantity of the servo. Here the input quantity is an electrical signal whose magnitude depends on the position of the dial 44 and attached shaft 46 shown in FIGURE 5. If desired, however, an automatic frequency sweep drive motor 45 can be connected to the shaft 46 by clutch 47 to automatically sweep the vibrator through the whole range of frequencies. The preferred embodiment of the dial is logarithmically graduated to minimize percentage errors.

Whether the operation is manual or automatic has no effect on the servo. The shaft 46 drives a logarithmic potentiometer 48 which furnishes a 400 cycle signal to an amplifier 49. The output of the amplifier is used to drive a motor 52 and the motor speed is directly related to the dial position. The motor drives a synchro 53 and a feedback tachometer 54, which provides a feedback voltage for amplifier 49 that is proportional to the speed of the motor 52. The synchro 53 output is a 400 cycle signal amplitude modulated by the output of the motor. This signal is the vibration command signal that controls the frequency of the vibrator.

The control unit, in addition to providing means for controlling the "frequency" of the vibrator, also contains apparatus for controlling the "force output" of the vibrator. This is accomplished by controlling the magnitude of the command signal by transmitting it from terminal A to wiper 55 of a force control potentiometer 56. Wiper 55 is connected to dial shaft 46 and movement of the shaft causes the wiper to move, changing the potentiometer resistance in the circuit, and thus the magnitude of the comamnd signal appearing on the potentiometer output terminal B. It should be obvious that one skilled in the art could readily provide a force control potentiometer that would produce any desired magnitude of command signal at any particular frequency setting of the dial 44 and shaft 46.

Thus, the command signal that appears on terminal B has both frequency and magnitude information that is carried to the servo amplifier via terminal C and switch 59. It should be understood that this command signal can be sent to a plurality of servo amplifiers and thence to their respective vibrators merely by using appropriate switches at terminal C. By the same means, the command signal can be sent to a phase shifting network if desired, and then to a servo amplifier. If this is done, various phase relationships between vibrators can be obtained. Practical considerations, however, such as the stress or strain a particular structure can withstand, may limit the "out of phase" operation of a plurality of vibrators.

In the preferred embodiment of the testing apparatus, provision is made for changing the phase of a vibrator by 180°. The operation of the left wing vibrator 180° out of phase with the right wing vibrator will normally induce asymmetrical vibration of the wings. This is done, however, without using a phase shifting network by merely interchanging input leads 60 and 61 of the vibrator, such as by a switch, and thus causing the command signal received by the vibrator to experience a phase shift of 180°.

As mentioned earlier, there may be applications where it is desirable to be able to comamnd the aircraft's autopilot from the control unit, so the control unit includes apparatus for converting the command signal into a signal which can be used by an autopilot. This apparatus consists of synchro 58 coupled by a gear train 57 to the output of motor 52. The output of synchro 58 is a 400 cycle amplitude modulated signal which is sent to switch 59. When switch 59 is activated the servo amplifier is disconnected from the control unit and the autopilot is connected to receive the signal generated by synchro 58. When the servo amplifier is disconnected then the command signals can no longer reach the vibrator and it becomes inactive. Normally, however, the servo amplifier, not the autopilot, is connected to the control unit.

When the servo amplifier is connected to the control unit it receives the command signals and then sends them on to the vibrator. The servo amplifier and vibrator form a position type servo system (type 1 system, see reference previously mentioned). The command signal is received at the servo amplifier by A.C. amplifier 62 and compared with a position feedback signal. The resultant signal is sent to the discriminator 63, which demodulates the 400 cycle carrier, and then to network $R_1$, $R_2$, $C_1$ which produces a phase lead to overcome part of the system lag present in the vibrator unit. This modified signal is then sent to the amplifier 64 where it is mixed with a feedback signal which is proportional to the velocity of the vibrator mass. The resultant output of amplifier 64 is fed to the coil 65 of valve 33 in the vibrator. Valve 33 converts the electrical command signal (sine wave) to a hydraulic pressure variation which in turn drives the mass so that it oscillates sinusoidally in accordance with the command signal. The position transducer 36, attached to the mass, provides a feedback signal that is a modulated 400 cycle signal which is shifted 180° in phase with respect to the input of amplifier 62. Part of the feedback signal is fed through an amplifier 66, discriminator 67 and differentiating network $R_3$ and $C_3$, to provide a signal proportional to the velocity of the mass. This signal is sent to amplifier 64 and is used to provide damping at the natural frequency of the system. The rest of the feedback signal is transmitted to amplifier 62 where it is compared with the command signal.

The power supply terminal for amplifier 64 is located in the control unit. This terminal is labeled B+. When the quick stop switch 68 is moved to the stop position the power supply voltage is removed from the servo valve coil 65 and the amplifier 64. Then amplifier 64 can no longer send signals to the servo valve. When switch 68 is moved to the stop position it also energizes a hydraulic dump valve, not shown, which removes hydraulic pressure from the servo valve 33. With the command signals and hydraulic pressure removed from the valve, the pressures on both sides of the piston equalize and the piston stops in the center of the vibrator. The piston and attached mass come to a stop within a fraction of a cycle. This permits observation of structural vibration decay rates.

FIGURE 6 shows a graph of vibrator frequency vs force output that are the result of varying the command signal. The force output plotted is the value F previously derived and found to be proportional to $MXW^2$. A plot of $MXW^2$ vs W (frequency) is not a straight line. Thus, if a straight line curve as shown in FIGURE 6 is desired, or if any particular non-linear curve is desired, the force control potentiometer should be designed to provide the necessary compensation. In addition, since the frequency control dial and frequency control potentiometer are logarithmic, the force control potentiometer should be designed to compensate for this too. This is not a difficult task, however, for one skilled in the art.

While certain preferred embodiments of the invention have been specifically disclosed it is understood that the invention is not limited thereto as many variations will be readily apparent to those skilled in the art and the invention is to be given its broadest possible interpretation within the terms of the following claim.

What I claim is:

For use in subjecting a structural element to dynamic loads, force generating apparatus comprising an outer housing fixed to said structural element, said housing including therein a translationally movable double ended piston, said two ends being opposing ends, said piston being substantially cylindrical, a substantially cylindrical piston guide rod positioned longitudinally through said piston, said piston being movable back and forth on said guide rod, said guide rod being fixed to said housing, a mass attached to said piston to move therewith, an electrohydraulic valve, connectors for connecting said valve to a hydraulic power supply, two piston cylinders, one of said cylinders being positioned over one end of said piston and piston guide rod and the other of said cylinders being positioned over the other end of said piston and piston guide rod, said cylinders having parts for admitting hydraulic fluid from the exteriors of said cylinders to the interiors of said cylinders, said interiors being adjacent said piston ends, hydraulic lines connecting said exteriors to sad electrohydraulic valve, said valve selectively controlling the hydraulic pressures applied to said opposing piston ends through said cylinder parts in accordance with electrical signals received by said valve, and electrical connecting means for connecting said valve to electrical control apparatus.

References Cited in the file of this patent

UNITED STATES PATENTS

| | | |
|---|---|---|
| 2,305,268 | Minor | Dec. 15, 1942 |
| 2,362,467 | Clark | Nov. 14, 1944 |
| 2,599,036 | Efromson et al. | June 3, 1952 |
| 2,773,482 | Dickie | Dec. 11, 1956 |
| 2,955,460 | Stevens et al. | Oct. 11, 1960 |

OTHER REFERENCES

Publication, Electronics, March 1949, pp. 86–91, article by Willson. (A photostat copy is in Division 36, 73–67.2.)

Publication, Product Engineering, Design Ed., December 9, 1957, pp. 94–98, article by Dickie. (A reprint copy is in Division 36, 73–71.6.)